United States Patent [19]

Eckman

[11] Patent Number: 4,911,322

[45] Date of Patent: Mar. 27, 1990

[54] SANDWICH PREPARATION AND WARMING PAN

[76] Inventor: Kelly G. Eckman, 844 Freeport Rd., Freeport, Pa. 16229

[21] Appl. No.: 327,692

[22] Filed: Mar. 23, 1989

[51] Int. Cl.⁴ .............................................. B65D 25/28
[52] U.S. Cl. .......................... 220/94 A; 220/DIG. 13; 220/DIG. 25; 99/646 C
[58] Field of Search .... 220/94 A, DIG. 13, DIG. 25, 220/1 R; 99/646 C, DIG. 15

[56] References Cited

U.S. PATENT DOCUMENTS 4,106,658  8/1978  Brandon ........................... 220/94 A
4,266,668  5/1981  Paek ................................. 220/94 A
4,491,235  1/1985  Fournier et al. ................. 220/94 A Primary Examiner—Joseph Man-Fu Moy
Attorney, Agent, or Firm—George C. Atwell

[57] ABSTRACT

An improved preparation and warming pan structure for supporting an elongated sandwich bun in an open position while the sandwich is being prepared and heated. Opposite long side panels which are integral extensions of the pan's flat bottom are angled and configured to support the bun in proper preparation position and promote even heating of the prepared sandwich when the user grasps a projecting integral handle portion of the pan and places it for a predetermined heating time on an oven rack.

6 Claims, 3 Drawing Sheets

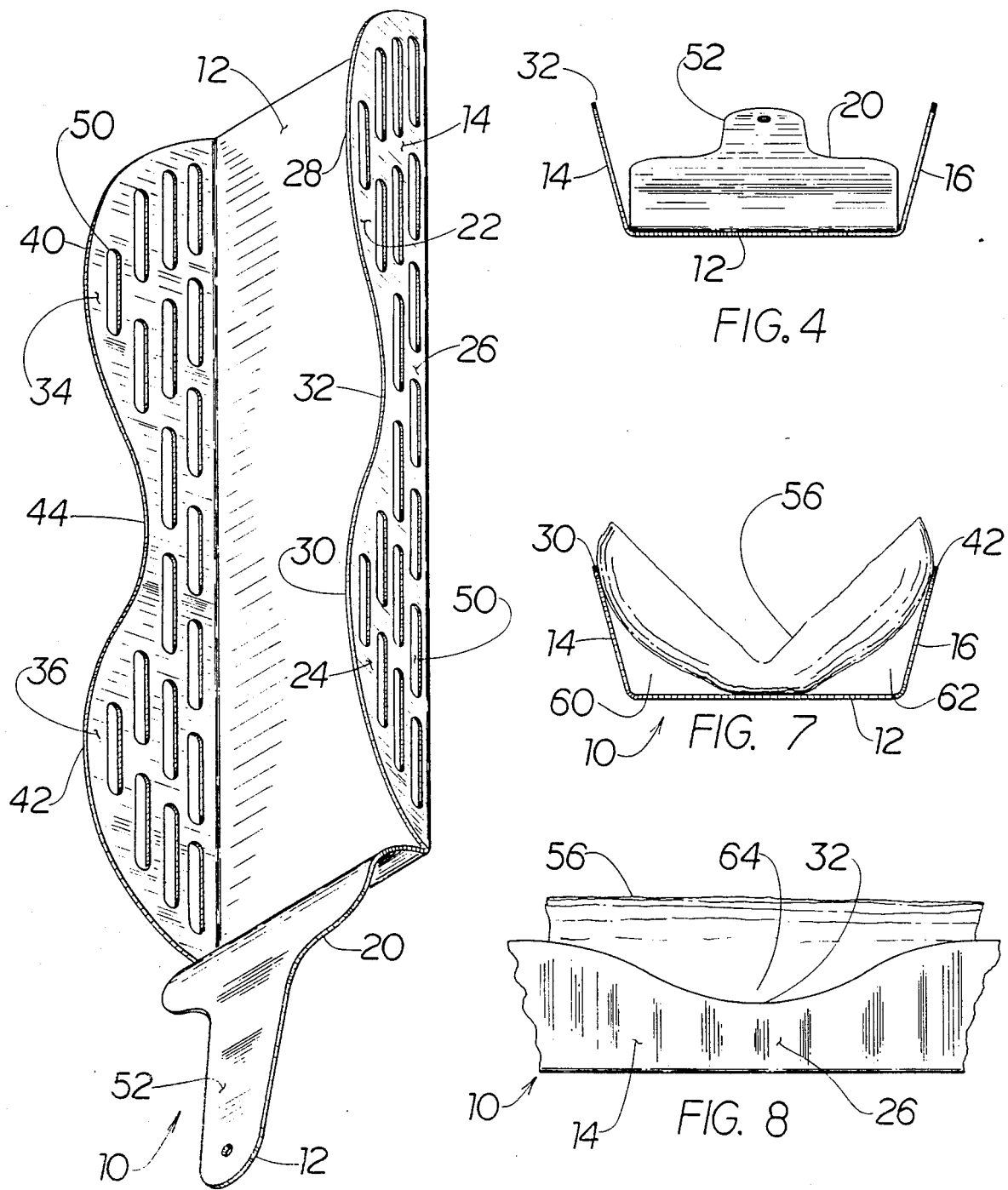

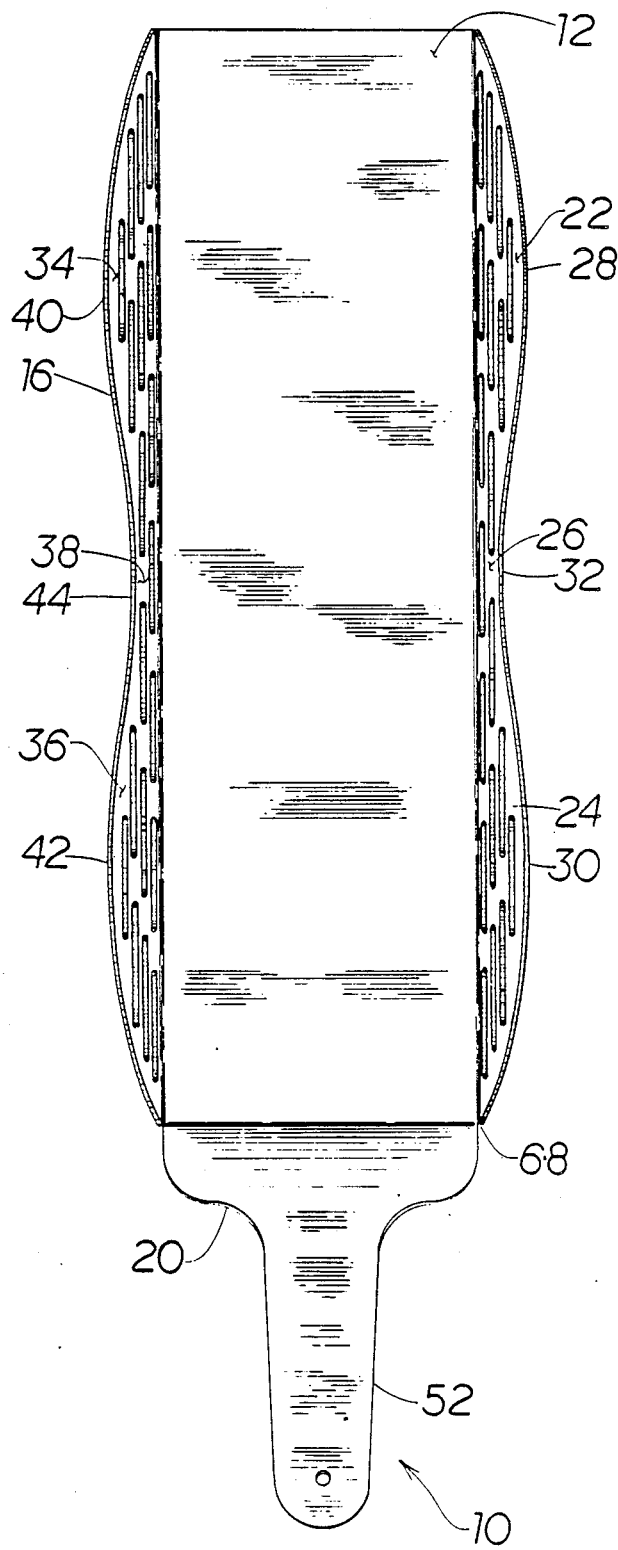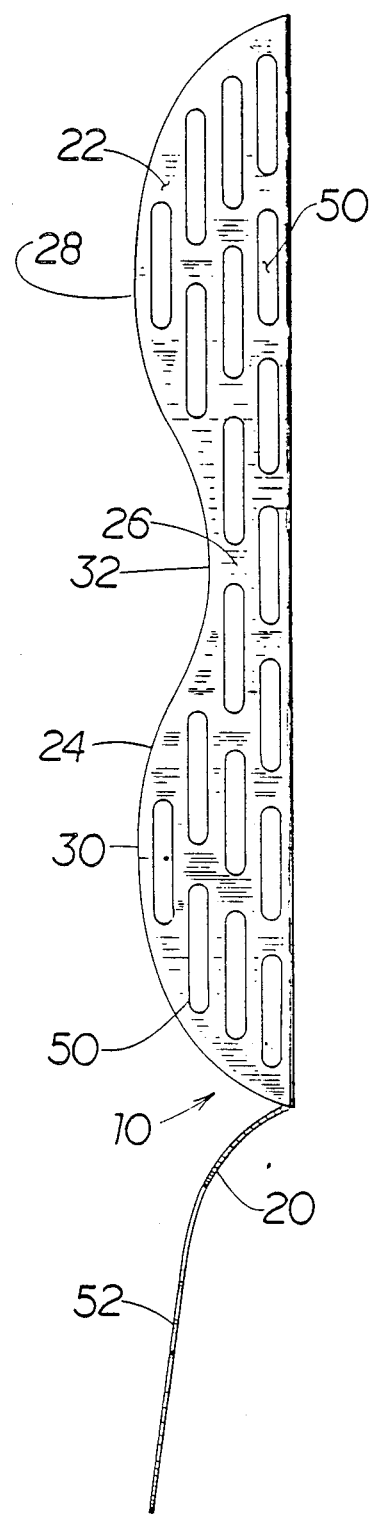
FIG. 5
FIG. 6

SANDWICH PREPARATION AND WARMING PAN

BACKGROUND OF THE INVENTION

This invention relates generally to structures for food preparation, and more particularly pertains to a pan for supporting an open-faced elongated sandwich bun for preparation and heating of the sandwich.

The type of sandwich known as a "hoagie" or "submarine" sandwich has gained and retained wide popularity over the years as a fast food item. For such a sandwich, it is customary to use an elongated bun in a shape resembling an enlarged hot dog bun which, in preparation, is slit partially through lengthwise to allow it to be opened to a wide V disposition, thus presenting an upwardly-facing trough into which is placed selected sliced meats, various chopped vegetables, a preferred dressing, and usually a sliced cheese topping. For serving such a sandwich in a fast food outlet, it is usually placed in an oven to warm the bun and the ingredients and melt the cheese. Rapid even heating of the sandwich and crisping or toasting of the bun is desirable but is not easily accomplished when the sandwich is placed on a flat pan on the oven rack. Moreover, there is a problem in properly handling the heated sandwich during its removal from the oven and its placement on an appropriate serving plate or wrapping it to retain the heat when it is intended for delivery elsewhere.

The foregoing problems have been previously recognized and attempts have been made to provide specialized support pans for such sandwich preparation. One notable example of structure intended to address these problems is found in the Brezinski U.S. Pat. No. 3,994,213, issued Nov. 30, 1976. There, a plurality of V-shaped troughs is provided on a frame of wire runners, and a separate tool, having the same trough configuration, is utilized to remove sandwiches from the structure after heating. That invention emphasizes the concept of providing extremely thin sheet metal sandwich supports to promote even heating but relies on the traditional framework to provide necessary rigidity to the structure.

SUMMARY OF THE INVENTION

The present invention comprehends the provision of a support structure for a submarine sandwich in the form of a pan shaped to improve the sandwich preparation step and also to enhance the sandwich warming operation. The structure of the invention is a stamped sheet metal preparation and warming pan, for supporting a single sandwich, having an elongated scoop-like body portion which presents an open front, and an integral rear handle portion. The body portion of the pan has a planar rectilinear bottom with integral planar oppositely-disposed side panels each projecting upwardly from the opposite long edges of the bottom. Each side panel is angled outwardly at an angle of approximately 20° to a vertical plane normal to the surface of the bottom.

Each of the two side panels of the pan is provided with first and second end portions of substantially equal height and an intermediate portion of lesser height than the end portions. Each side panel has a wave-like upper boundary configuration such that the upper edge of the first and second portions each has a convex curve, and the upper edge of the intermediate portion has a concave curve. The rear handle portion of the pan includes a base portion of the same width as the bottom from which it projects. Projecting integrally from the base portion is a tongue-like handle to facilitate manipulation of the pan.

Through the provision of the present invention, in either of two presently preferred embodiments hereinafter disclosed, it is a primary objective to provide a sandwich preparation and warming pan which adequately supports the bun during the preliminary sandwich preparation stage, and supports it in such a manner that exposure of the sandwich, and particularly of the bun, is enhanced by promoting more even radiant heating within the oven.

It is a second and equally important objective of the invention to provide a sandwich supporting pan adapted for ease of handling and maneuvering not only to and from the oven but also in the final step of removing the heated sandwich from the pan for serving or packaging.

An additional objective of the invention is to provide a sandwich preparation and warming pan of the type heretofore described which is economically manufactured and is easily cleaned after use.

Specific characteristics and features of the invention structure will be best appreciated from the ensuing detailed description and the accompanying drawings.

BRIEF DESCRIPTION OF THE DRAWINGS

FIG. 3 is a perspective view of an alternate embodiment of the present invention;

FIG. 4 is a front elevational view of the structure first shown in FIG. 3;

FIG. 5 is a top plan view of the structure shown in FIGS. 3 and 4;

FIG. 6 is a side elevational view of the structure shown in FIGS. 3, 4, and 5;

FIG. 7 is a cross-sectional view taken along the length of the pan structure of the present invention and illustrating the typical positioning of a bun on the pan structure; and FIG. 8 is a side elevational fragmentary view taken intermediate the length of the structure of FIG. 1.

DETAILED DESCRIPTION OF THE PREFERRED EMBODIMENTS

Figure 1:
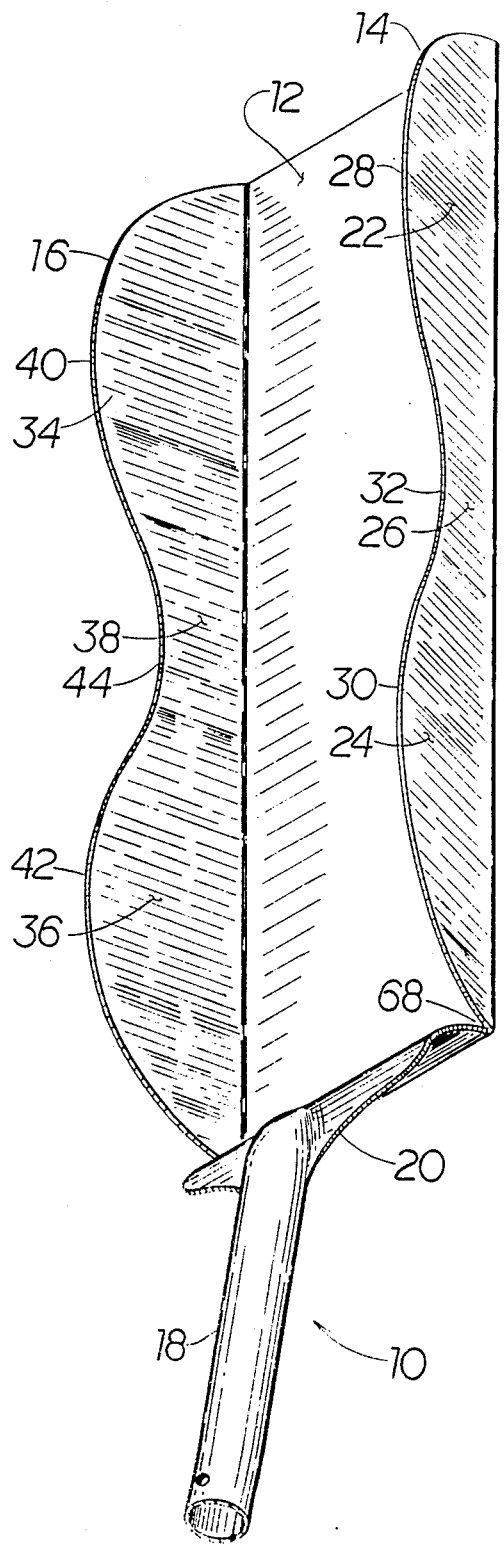
FIG. 1 is a perspective view of a first embodiment of the present invention.

In FIG. 1, there is shown a sandwich preparation and warming pan structure 10 stamped from sheet metal and formed to have a planar rectilinear bottom or bottom panel 12. Projecting upwardly from each long edge of the panel 12 are side panels 14 and 16 which are integral to the structure 10. As illustrated in FIG. 1, the structure 10 is open at its forward end and has, at its opposite or rearward end, an integral handle 18 projecting from a base portion 20.

Figure 2:
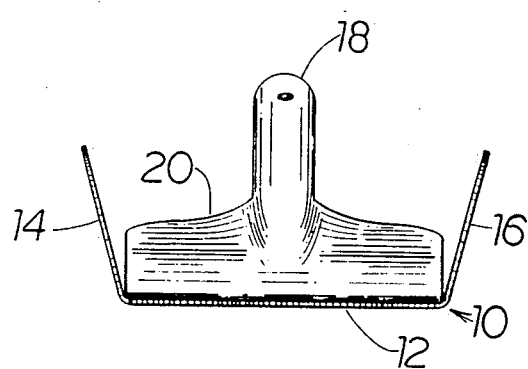
FIG. 2 is a front elevational view of the structure first shown in FIG. 1.

As most clearly illustrated in FIG. 2, each of the side panels 14 and 16 are oriented to diverse outwardly from the vertical, at an acute angle of 20° or at least within the range of 18°–25° taken in reference to a vertical plane normal to the flat surface of bottom 12. Each of the side panels 14 and 16 is configured whereby the upper boundary edge is a compound curve configuration. Side panel 14, for example, has first and second end portions 22 and 24 of equal height and an intermediate portion 26 of lesser height than the aforementioned end portions. The upper edges of the portions 22 and 24 each have a convex curve or crest, designated respectively as 28 and 30, whereas the intermediate portion 26 has a merging concave curve 32. The side panel 16, constituting a mirror image of the side panel 14, has first and second end portions 34 and 36 and an intermediate portion 38. The upper boundaries of portions 34 and 36, respectively, are convex curves or crests 40 and 42, and the intermediate portion 38 has an upper boundary concave curved edge 44.

As compared to the embodiment of the invention shown in FIGS. 1 and 2, the alternative embodiment shown in FIGS. 3, 4, 5, and 6 differs in the shape and formation of the handle portion and in the provision, in the side panels of the alternative embodiment, of a plurality of evenly spaced openings or elongated slots 50 which tend to enhance the heating effect of the bun as hereinafter further explained. Hence, in view of the similarity of structure between the two embodiments illustrated, like numbers are used in the various views to denote like elements.

The distal end of the handle portion of the structure shown in FIG. 3 is a flat tongue 52. A simpler shape as compared to the tubular handle portion 18 of the embodiment shown in FIG. 1.

Having heretofore described the presently preferred embodiments of the structure of the present invention in terms of physical shape and characteristics, its advantages in actual use can now be set forth. Buns used for submarine sandwich preparation may vary in size both as to their length and girth. A typical elongated bun for such use, at a cross-section taken at an intermediate point along its length, is generally elliptical, having a long cross-dimension of approximately three inches and a transverse cross-dimension in the area of two inches. The bun, for sandwich preparation, is slit lengthwise on a line generally coincidental with the aforementioned long dimensions. The slit is usually about eighty percent of the bun depth whereby when the bun is opened to a wide V shape for preparation, the intact lower long side of the bun constitutes a joining hinge portion. When the bun is opened and placed, for sandwich preparation, on the pan structure such as shown in FIG. 1, then, regardless of slight variations in bun size, the opened face surfaces will form an angle in excess of 90°, generally approximating 110°. The bun will contact the pan on a longitudinal line centrally over the bottom 12, the underlying downwardly-facing ridge of the hinge area being the area of contact. Because such buns, in their original uncut disposition, tend to narrow slightly toward the opposite ends, only about two-thirds of the length of the bun, between the ends, will actually rest against the bottom 12 when the bun is in its open V-shaped position for preparation. The undersurfaces of the two outwardly diverging sides of the open bun also come in contact with and rest against the pan body, at four points, each along the side panel crests 28, 30, 40, and 42.

In FIG. 7, an illustrative conception of an open sandwich bun 56 in the pan 10 is presented, and should be viewed as a cross-sectional representation taken along the length of the pan 10 where the under surface of the sides of the bun would make contact along the oppositely disposed arcuate side panel crests 30 and 42. It can thus be seen in FIG. 7 that open longitudinal channels 60 and 62 are formed between the inside surface of the pan 10 and the undersurface of the bun sides. Further, as shown in FIG. 8, along the side panel 14 of the pan 10, an open area 64 is defined by the concave arcuate edge 32 and the under surface of the side of bun 56, with such open area 64 in communication with the channel 62 shown in FIG. 7. FIG. 8 also can be taken to represent the appearance of a fragmentary elevational view taken along the side 16 of pan 10 where an identical open area, like the area 64 shown in FIG. 8, would also be defined.

From the foregoing description it should be appreciated that unlike the prior art where a bun would be either supported in a substantially flat open position for preparation or in a fully supported V shape where the full length of the outside surface of the bun sides would be pressing against a supporting metal surface, the present invention provides for support of the bun at a limited number of diverse points so that the greater part of the outside bun surface does not receive its heat, during the heating operation, directly by conductance from a contiguous metal surface but rather, from ambient heated air currents and direct radiant heat. This exposure of the outer bun surface enables more even heating and the attainment of a crisping or toasting effect on the bun's exterior which occurs simultaneous with the heating of the other food ingredients placed on the bun's open surface and the melting of the customary cheese layer.

The improved heating efficiency obtained by the shape of the pan structure of this invention is further enhanced by having the integral handle, at its base portion 20, shaped and oriented to project away from the area in the scoop-like structure which, during use, is occupied by the sandwich being prepared and heated. More specifically, the base portion 20 is rearwardly curved in a substantially large radius whereby, at its two opposite lateral edges it forms, in combination with the downwardly curved rear ends of the respective side panels 14 and 16, an open notch-like configuration 68 at each rear corner (see FIGS. 1 and 5). This, combined with the rearwardly rolled shape of the handle base end 20, establishes a fully open area to promote the radiant heating of the adjacent sandwich end, substantially consistent to that which will occur at the other end of the sandwich toward the open front end of the structure 10.

The disal end of the handle 18 shown in FIG. 1 is tubular and of a length sufficient to enable the user to grasp it with proper leverage to easily manipulate the pan when taking it in and out of the oven or holding it to slide the prepared sandwich off the forward end of the pan onto a serving plate or into paper or cardboard packaging. The tubular handle shown in FIG. 1 is stamped and rolled as part of the forming operation of the entire pan body. In the pan's flay layout, prior to forming it to the configuration shown, the distal end of the handle 18 shown in FIG. 1 is a flat rectilinear extension that is, as part of the pan formation, stamped to form the forward merging shoulder at the terminus of the base portion 20 and roll-folded to the tubular configuration whereby the two outward longitudinal edges come to abut each other at a longitudinal underside line (not shown). This tubular handle formation, on the embodiment shown in FIG. 1, can be replaced, if desired, by the simpler and less costly flat tongue-like handle shown in FIG. 5 without departing from the base portion 20 configuration.

The pan structure herein described will attain the desired functional characteristics of improving and enhancing even heating and crisping of a submarine-type sandwich, even where there is some variance in the length and girth of the buns being processed, so long as certain dimensions of the pan structure are maintained. It is preferred that the bottom 12 be twelve inches long and three inches wide. The dimension of the height of the side panels 14 and 16, from the bottom 12 to the highest point on the concave arcuate portions or crests 28, 30, 40, and 42, is one and one-half inches. The height of the intermediate wall portions 26 and 38 are held at three-quarters of an inch although this dimension could be less so long as the structural integrity of the pan is maintained.

Buns produced for submarine sandwiches generally do not exceed the preferred length of the pan 10 and will seldom be less than nine inches in length. The height of the side panels 14 and 16, and the substantially wide radius of their highest arcuate crests assures that four point contact at the outer edges of the underside of the open bun will occur, despite substantial variance in bun girth, whereby the desired open bun disposition, as shown in FIG. 7 will be obtained.

Hence, the preferred configuration of the pan 10, particularly with regard to the upper boundary edge configuration of the side panels, enables versatile adaptation to bun size variation without detracting from the desired sandwich heating characteristics.

Although the presently preferred embodiments have been described with some particularity, it is to be understood that other embodiments or variations may be made without departing from the spirit and scope of the invention, as those skilled in the art will readily understand. Such embodiments and variations are considered to be within the purview and scope of the invention as defined in the appended claims.

I claim:

1. A stamped sheet metal sandwich preparation and warming pan having an elongated body portion with an open front and an integral rear handle end;
    the body portion having a planar rectilinear bottom panel and planar oppositely-disposed side panels each projecting upwardly from a long edge of the bottom panel at an acute angle outwardly from a line normal to the surface of the bottom panel, the side panels defining, in combination with the bottom panel, a scoop for supportably retaining an open sandwich bun;
    each side panel having first and second end portions of substantially equal height and an intermediate portion of lesser height than the end portions, each side panel having a wave-like upper boundary configuration such that the upper edge of the first and second portion each has a convex curve and the upper edge of the intermediate portion has a concave curve.

2. The sandwich preparation and warming pan of claim 1 wherein the integral rear handle end includes a base portion projecting from, and of substantially equal width to, the bottom panel.

3. The sandwich preparation and warming pan of claim 1 wherein the acute angle is within the range of 18°–25°.

4. The sandwich preparation and warming pan of claim 1 wherein each of the side panels has a plurality of openings therethrough which are located in a uniform pattern along the full length of the panel.

5. The sandwich preparation and warming pan of claim 4 wherein the openings are identical in size and are longitudinally elongated.

6. The sandwich preparation and warming pan of claim 1 wherein the handle end projects from the bottom panel in a disposition defining an open area above each of two rear corners of the pan bottom.

* * * * *